United States Patent [19]
Batzdorff

[11] 4,331,866
[45] May 25, 1982

[54] ELECTRO-MECHANICAL DIGITAL FEED CONTROL

[75] Inventor: Alfred Batzdorff, Lansdale, Pa.

[73] Assignee: American Electronic Laboratories, Inc., Lansdale, Pa.

[21] Appl. No.: 156,730

[22] Filed: Jun. 5, 1980

[51] Int. Cl.³ .............................................. G01D 5/34
[52] U.S. Cl. ........................... 250/231 SE; 340/347 P
[58] Field of Search ..................... 250/231 SE, 237 G; 356/39 S; 340/347 P

[56] References Cited

U.S. PATENT DOCUMENTS

| | | | |
|---|---|---|---|
| 3,525,094 | 8/1970 | Leonard | 250/231 SE |
| 3,623,079 | 11/1971 | Schuman | 340/347 P |
| 4,123,653 | 10/1978 | Bovio | 250/237 G |

*Primary Examiner*—David C. Nelms
*Attorney, Agent, or Firm*—Seidel, Gonda, Goldhammer and Panitch

[57] ABSTRACT

An electro-mechanical digital feed apparatus is provided with an optical encoder control unit. The control unit comprises a system of photocells and LED light sources, separated by program discs having precisely spaced holes therein. The discs are mounted on rotating shafts which are linked to a shaft of the processing machine, so that the disc shafts rotate at a constant fraction of the rotational speed of the processing machine shaft. As a disc hole passes between an LED and a photocell, the photocell produces a pulse of electrical energy which is amplified to provide input power for an electrical stepping motor. Means are provided for selectively varying the number of pulses generated per revolution of the processing machine shaft. The discs are provided with a plurality of programs in the form of concentric circular bands containing different numbers of holes. Some of the discs are mounted on shafts that run at higher speeds than others and have a uniform zero position where no holes are contained. Pulses from the regular speed shafts are generated during zero positions of the higher speed shafts and may be added in selectable numbers to the pulses produced by the higher speed shafts. By selecting the discs which input pulses to the pulse train, a pulse train containing a selectable number of uniformly spaced pulses per revolution of the machine shaft can be input to the stepping motor, providing a smooth and selectable feed control.

16 Claims, 15 Drawing Figures

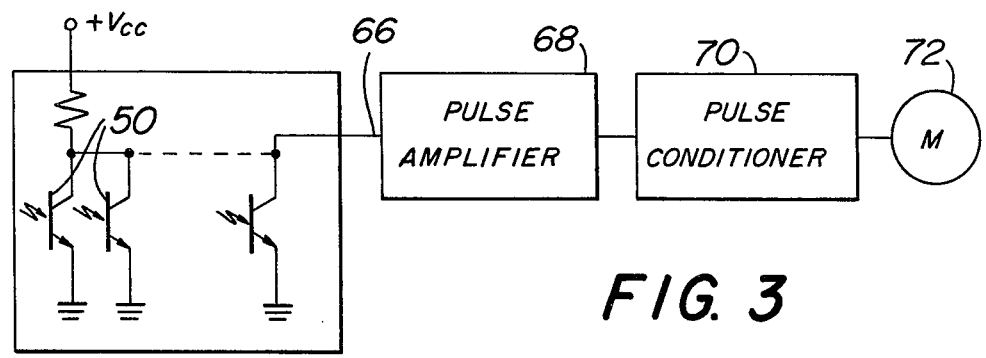
FIG. 3
FIG. 4
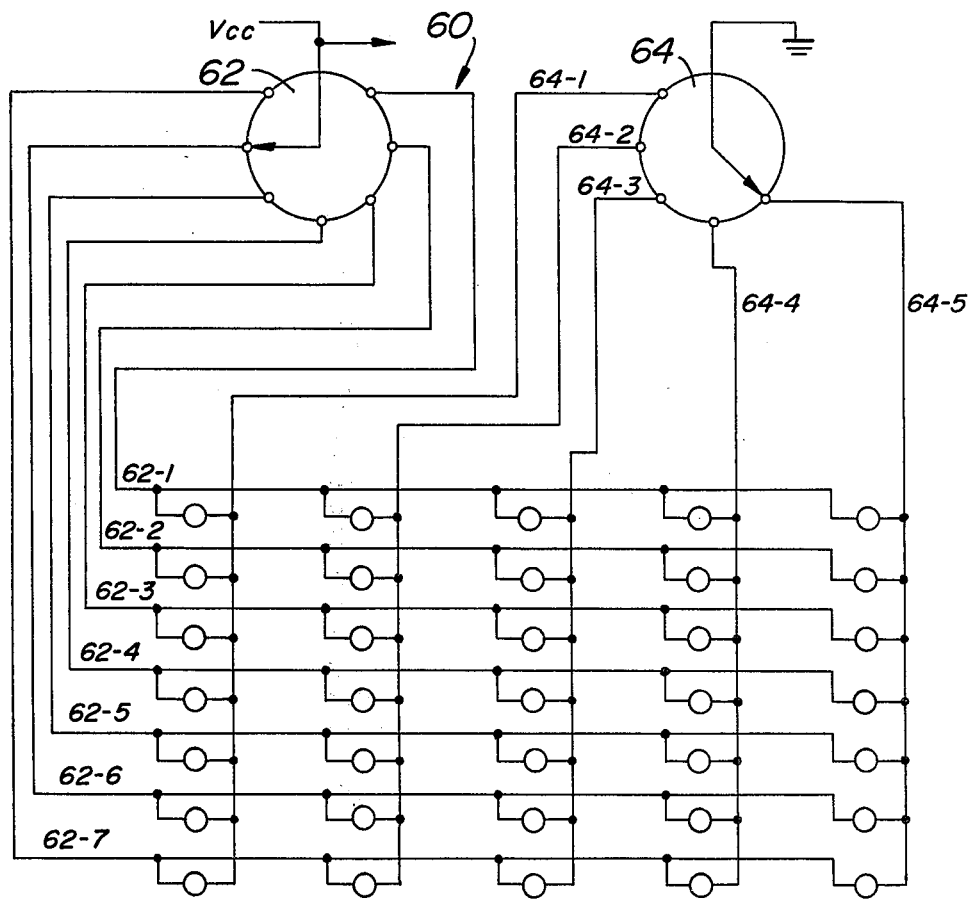

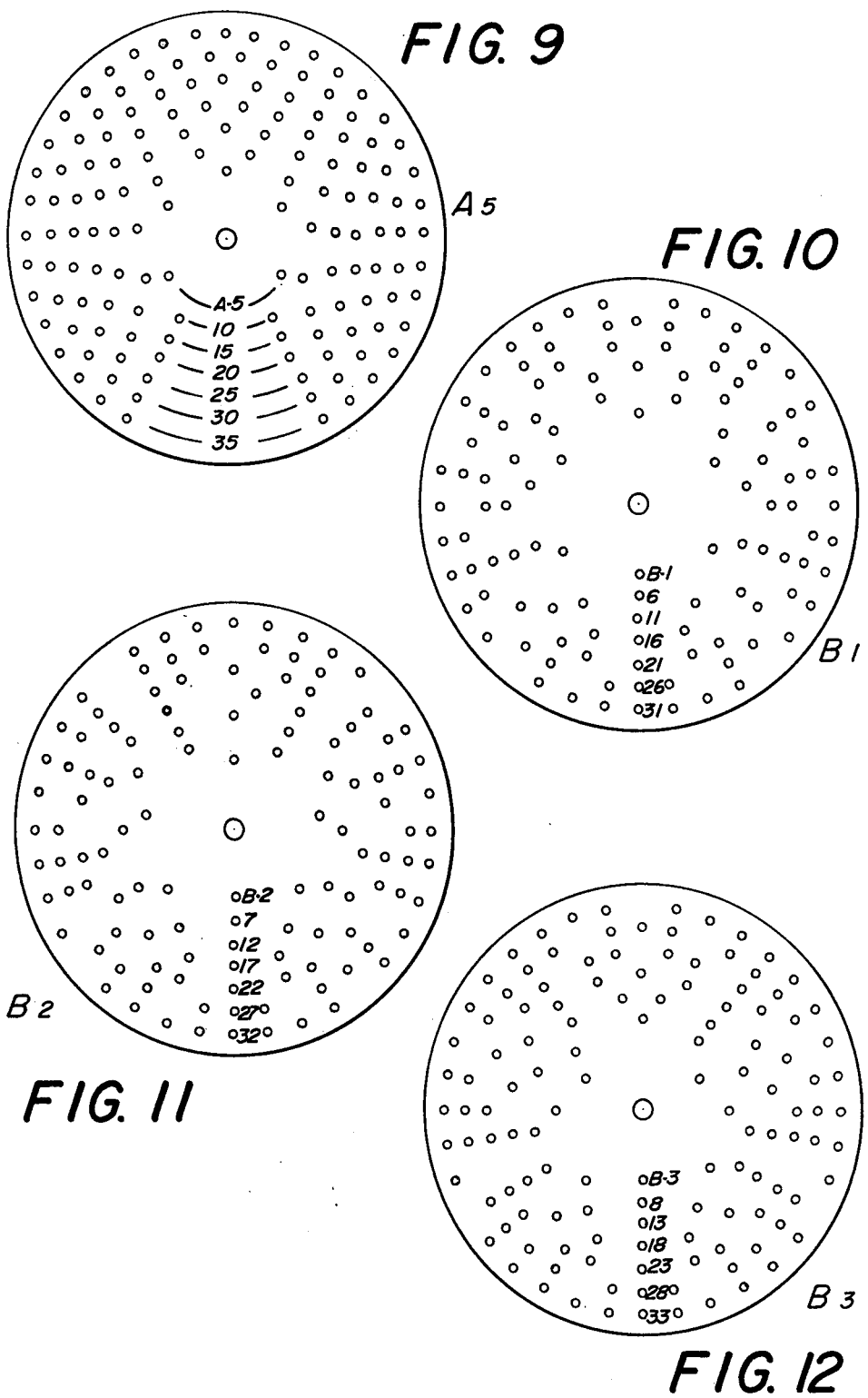

ELECTRO-MECHANICAL DIGITAL FEED CONTROL

BACKGROUND OF THE INVENTION

In a wide variety of machines it is advantageous to have a tool advance in a controlled manner or to have the workpiece continuously fed into the machine. This is accomplished by providing a geartrain or track to advance the workpiece or tool. This invention relates to those machines in which it is advantageous to have the rate of advance of the tool or workpiece be proportional to the speed of some operating element within the machine. An obvious example of such machines are coil-winding machines, where the rate of advance should be proportional to the rotational speed of the drum. This relationship between the machine speed and the rate of advance is also advantageous in machines such as lathes, where the spindles or bits may rotate at various speeds under varying loads. To avoid needless recitation, the general term "carriage" will be used hereinafter to denote all types of tools or workpieces.

In the past, control units for providing that the carriage advance at a rate related to the speed of the machine have largely involved some sort of gearing, or a servomechanism with a feedback loop. The predominant approach has been to feed back an analog electrical signal related either to the speed of the machine or to the differential between the machine speed and the rate of advance of the carriage. In such control units, it has been difficult to provide uniform control over broad ranges of machine speeds and rates of carriage advance. Additionally, it has been difficult to make the rate of advance selectable in small increments over these broad ranges. The analog systems have not proven to allow accurate control of speeds over broad ranges and small increments.

Digital systems wherein the carriage is caused to advance by an electrical stepping motor have the potential to provide such controlled, programmable rate of advance. In an electrical stepping motor, the motor output causes an advance which is directly proportional to the number of pulses of electrical energy received by the motor input. The motor can be generally described as advancing the carriage a uniform distance per pulse of received electrical energy.

The input to the stepping motor must be a train of pulses of electrical energy that is related to the speed at which the machine is processing the workpiece. Specifically, the pulse train must contain a selectable number of electrical pulses per revolution of the shaft of the processing machine.

A conventional optical shaft encoder could theoretically perform this task. Such an encoder would use a disc or set of discs containing a progressive number of optical holes in concentric bands and mounted on the machine shaft. LED light sources and photocells would be arranged in matched pairs in alignment with the bands of the discs, so that light from an LED would produce a pulse of electrical current from its paired photocell whenever rotation of the disc brought a hole in alignment between the LED and photocell. By selecting a particular LED/photocell pair as the output, a train of pulses related to the rotation of the machine shaft could be generated.

However, such a conventional encoder would become impractically large if selectability in small increment is desired over a broad range of rates of advance. For instance, if a rate of advance selectable in increments of 0.001 inch per revolution of the machine spindle over a range of from 0 to 2.5 inches per spindle revolution were desired, a conventional encoder would require 2500 programs, each having an LED/photocell pair and the associated wiring for program selection.

OBJECTS OF THE INVENTION

Accordingly, it is an object of the present invention to provide a feeding apparatus wherein the rate of advance of the carriage is proportional to the speed of the processing machine over a broad range of machine speeds.

Another important objective is to provide a control unit for the feeding apparatus which will provide the desired control of rate of advance even during acceleration and deceleration.

Another important objective is that the rate of advance be selectively variable in small increments over a relatively broad range. For instance, in the embodiment described herein, where the rate of advance is measured in inches of advance per revolution of the spindle or other rotating shaft of the processing machine, it is desirable to provide a feeding apparatus where the rate of advance is selectable in increments of 0.001 inch per spindle revolution over a range of from 0 to 2.5 inches per spindle revolution.

Another objective is that the control unit be practical in size, number of components, and wiring complexity even for a selectable range and increments as described above.

It is the further objective of the present invention that the steps required to effect the above selection between incremental feed rates be capable of being carried out quickly and easily and with no disassembly of the feed apparatus required or automatically through pre-programmed information.

SUMMARY OF THE INVENTION

In view of the above objectives, a control unit is provided in an apparatus for feeding a carriage of a machine having at least one rotating shaft which is indicative of the speed at which the machine is processing the workpiece. Such a shaft could be, for instance, the drum spindle on a coil winding machine. The control unit includes a means for generating a selectable number of electrical pulses per revolution of the shaft of the processing machine. The electrical pulses are supplied in a serial pulse train to an electrical stepping motor which advances the carriage a uniform distance per pulse of received energy.

The control unit comprises a system of photocells and LED light sources, separated by program discs having precisely spaced holes therein. The discs are mounted on rotating shafts which are linked to the shaft of the processing machine, so that the disc shafts rotate at a constant fraction of the rotational speed of the processing machine shaft. As a disc hole passes between an LED and a photocell, light passes from the LED through the hole in the program disc to the photocell, and the photocell produces a pulse of electrical energy. This energy is amplified to provide input power for an electrical stepping motor.

The invention provides means for selectively varying the number of pulses to be generated per revolution of the processing machine shaft. The discs are provided with a plurality of programs in the form of concentric circular bands containing different numbers of holes. Additionally, some of the discs are mounted on shafts that run at higher speeds than others, and have a uniform zero position, where no holes are contained. Pulses from the regular speed shafts are generated during the zero positions of the high speed shafts and occur in the pulse train in zero position slots corresponding to a selectable number of rotations of the higher speed shafts. A means is provided for selecting the combination of disc programs which will be used to provide pulses to the stepping motor. In the preferred embodiment, this means is a set of five circular switch contacts operated by numbered thumbwheels.

For the purpose of illustrating the invention, there are shown in the drawings forms which are presently preferred; it being understood, however, that this invention is not limited to the precise arrangements and instrumentalities shown.

BRIEF DESCRIPTION OF DRAWINGS

FIG. 3 is an abbreviated schematic diagram of the electrical portion of the feeding apparatus.

FIG. 4 shows a 5×7 circular contact selector switch.

FIG. 9 shows a fifth program disc of the A program.

FIG. 10 shows a first program disc of the B program.

FIG. 11 shows a second program disc of the B program.

FIG. 12 shows a third program disc of the B program.

DETAILED DESCRIPTION

Figure 1:
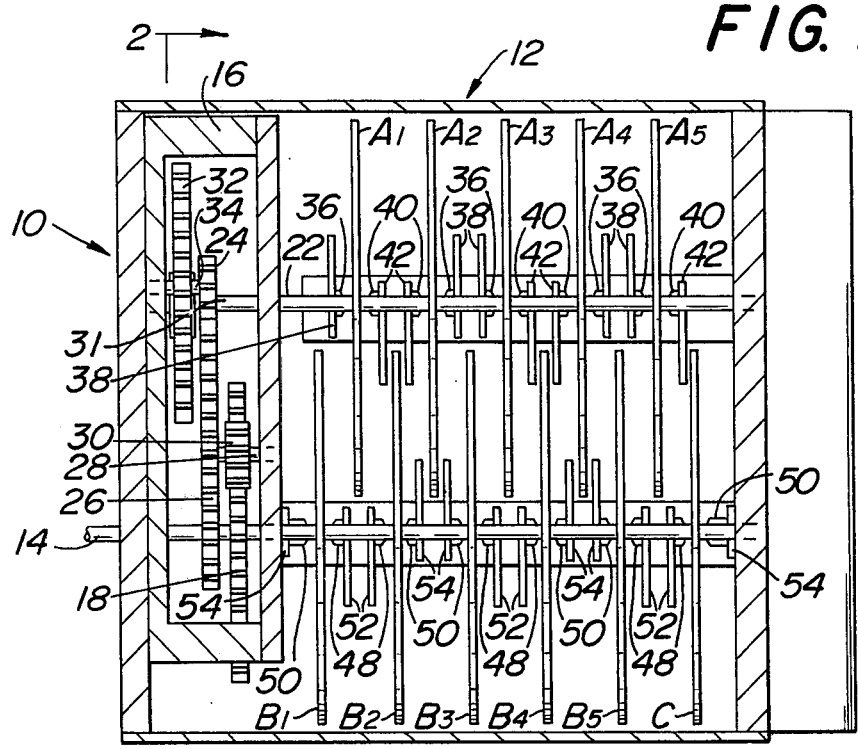
FIG. 1 is a top section view of the control unit.

Referring now to the drawings wherein like numbers refer to like elements, FIG. 1 shows a control unit designated generally as 10. The control unit 10 is enclosed by a housing 12. Extending through the housing 12 is a reference shaft 14 coupled to the spindle of the processing machine. Reference shaft 14 rotates at a speed that is related to the rate at which the processing machine is processing the workpiece. Thus, reference shaft 14 may be coupled to the actual drive shaft for the main processing element in the processing machine, such as the drum shaft in a coil-winding machine or the shaft driving the spindle in a lathe, or it may be coupled to a shaft incorporated into the machine for the specific purpose of providing a rotational reference speed for use with the control unit.

In the embodiment shown, shaft 14 is coupled to the machine tool and also has associated with it the "B" program discs which will be described below. To facilitate identification later, shaft 14 will hereinafter be referred to as Beta shaft 14 indicating the association with the B program discs.

Figure 2:
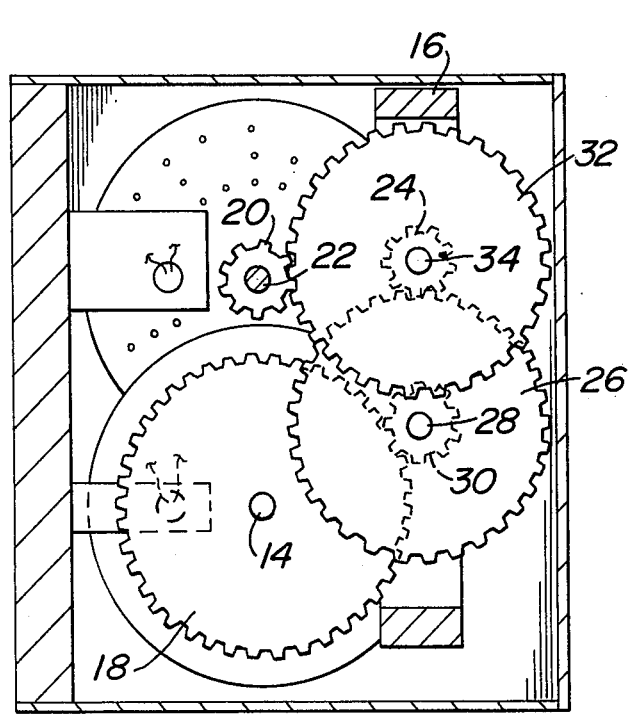
FIG. 2 is a front section view of the control unit of FIG. 1 along the line 2—2.
Figure 5:
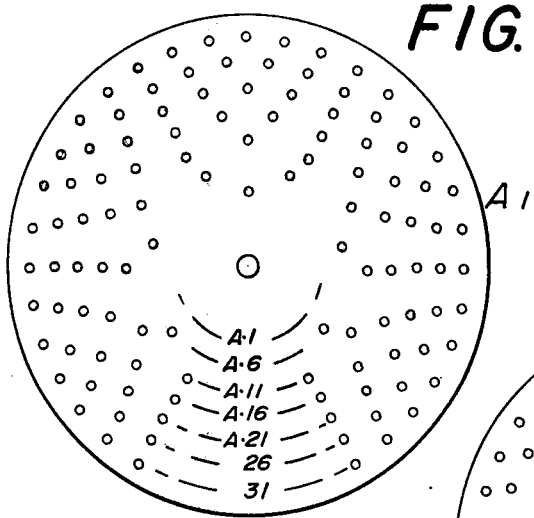
FIG. 5 shows a first program disc of the A program.
Figure 6:
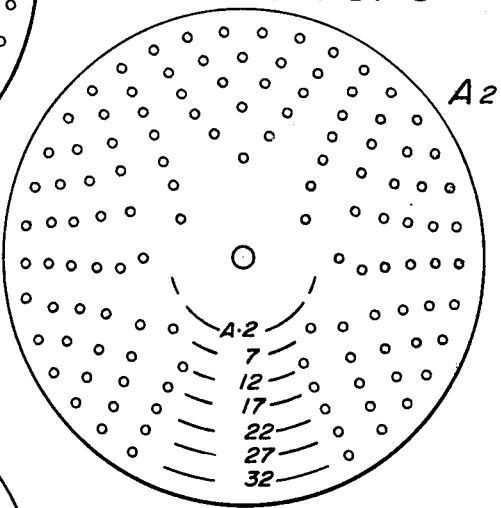
FIG. 6 shows a second program disc of the A program.
Figure 7:
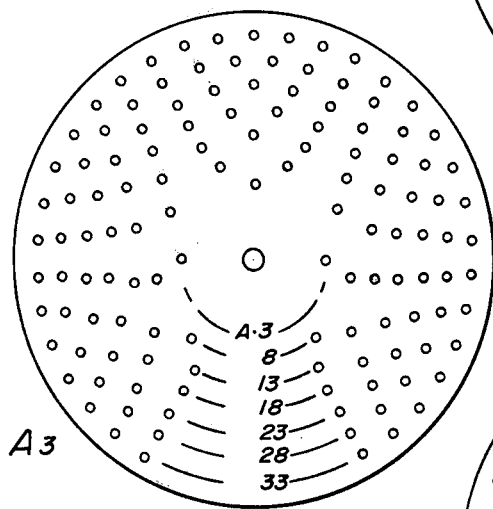
FIG. 7 shows a third program disc of the A program.
Figure 8:
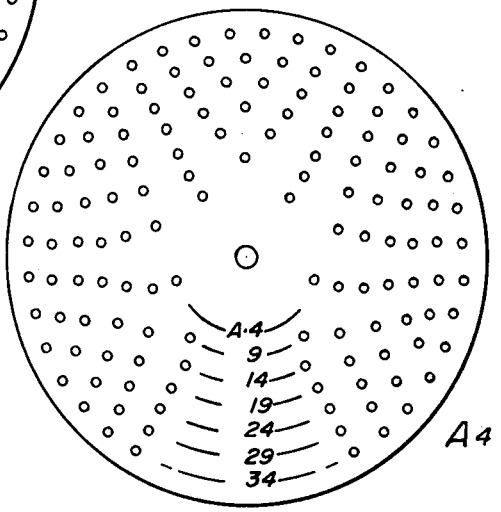
FIG. 8 shows a fourth program disc of the A program.
Figure 13:
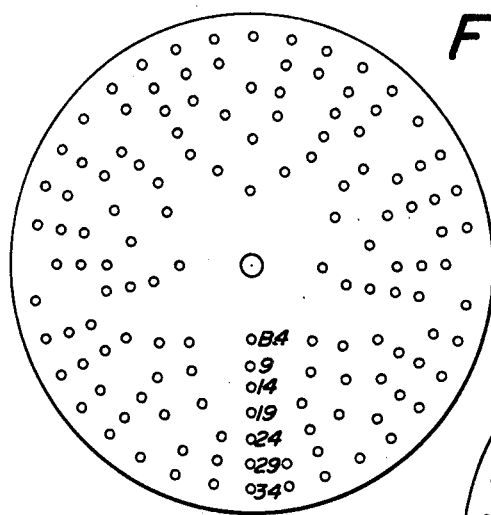
FIG. 13 shows a fourth program disc of the B program.
Figure 14:
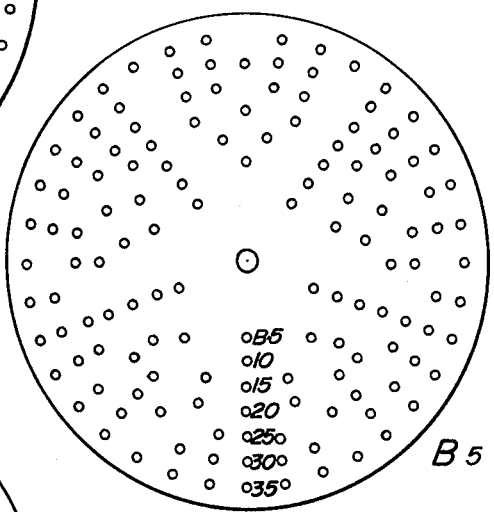
FIG. 14 shows a fifth program disc of the B program.
Figure 15:
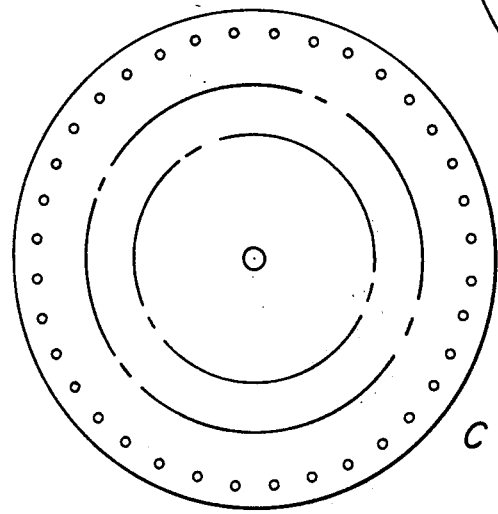
FIG. 15 shows the C program disc.

Shaft 14 is linked to the other control shafts by the gear arrangement shown in gearbox 16. Any system of gearing which establishes the proper relationships of shaft speeds can be utilized, and the invention is not limited to the specific arrangement shown in the preferred embodiment depicted in the drawings. However, in a preferred embodiment, which may be best viewed in FIG. 2, spur gear 18 is mounted on Beta shaft 14. Spur gear 18 meshes with pinion gear 30, mounted on idler shaft 28. Also mounted on idler shaft 28 is the spur gear 26. Spur gear 26 meshes with pinion gear 24, mounted on idler shaft 34. Also mounted on idler shaft 34 is spur gear 32. Spur gear 32 meshes with pinion gear 20, mounted on shaft 22 (hereinafter referred to as Alpha shaft 22 to indicate that this shaft is associated with the "A" series of program discs). Although the drawings are not to scale, in the preferred embodiment the ratio between spur gear 18 and pinion gear 28 is 4½ to 1, between spur gear 26 and pinion gear 24 is 4 to 1 and between spur gear 32 and pinion gear 20 is also 4 to 1, giving a composite ratio between the Alpha and Beta shafts of 72:1. Thus, for each revolution of Beta shaft 14 there are seventy-two corresponding revolutions of Alpha shaft 22.

Mounted on Alpha shaft 22 are five program discs designated as $A_1$ through $A_5$ which may be viewed in FIGS. 5-9 respectively. Each of the A program discs contains seven programs, in the form of seven concentric bands containing different numbers of holes. As can be seen from FIGS. 5 through 9, the programs range from 1 to 35 holes per concentric circle. The innermost circle of disc $A_1$ contains the A-1 program consisting of one hole. The innermost circle of disc $A_2$ contains the A-2 program consisting of two holes, and so on so that the A-5 program is on the innermost circle of the $A_5$ disc. The next program in sequence is then the A-6 program which is located on the second circle from the center of the $A_1$ disc. The progression of programs continues in serial fashion from disc $A_1$ to $A_5$ and from inner circle to outermost circle.

Light sources in the form of LED's and light receivers/transducers in the form of photocells, are used to produce electrical pulses when a program hole allows light to pass between the source and the photocell. The term "photocell", as used herein, should be interpreted broadly to include photoelectric cells and phototransistors, and equivalent devices for other light spectrums.

Although visible light is used in this embodiment, sound waves, electromagnetic energy or other spectrums of light such as infrared may be feasible. Additionally, if light sensitive detectors were used, it would be possible to have clear discs with opaque dots instead of holes and to produce a pulse when light is blocked from the receiver/transducer. However, the system described below using LED's and visible wave-length photocells is felt to be the most practical.

A set of seven LED-photocell pairs are disposed at each disc. Since there are five discs in the "A" program, it can be seen that there are thirty-five LED-photocell pairs associated with the A program. The LED's in the A program, designated generally as 36, are mounted in columns of seven on each of five LED support members 38. The spacing of the LED's in the columns corresponds to the radial displacement of the individual program bands of the A program discs, so that one LED is aligned with the holes in each program band.

Similarly, the corresponding photocells 40 of the LED-photocell pairs are mounted on photocell mounting members 42. The photocells 40 are arranged in columns of seven on each of the five mounting members 42 in the A program. Each photocell 40 is aligned with a corresponding LED to form a photocell-LED paid. Each pair is associated with one of the programs A-1 through A-35 on the A program discs. It can be seen then that to select a particular one of the programs A-1 through A-35, one need only selectively switch on the appropriate electrical connection for the particular one of the 35 photocell-LED pairs which corresponds to that program. In doing so, the LED is electrically powered to act as a light source. As the Alpha shaft 22 rotates, the discs $A_1-A_5$ rotate with it. The selected photocell-LED pair is mounted so that the holes in an associated one of the 35 program bands will pass in register with the photocell-LED as the disc rotates. As each hole passes in register between the photocell and LED, light from the LED passes through the hole and is received by the photocell, producing an electrical pulse at the photocell's output.

From the above, it can be seen that the number of pulses produced per each revolution of the Alpha shaft 22 is selectable from 1 to 35, depending on which A program is selected. Since the Alpha shaft 22 rotates seventy two times per one revolution of the Beta shaft 14, the number of pulses produced per revolution of the reference shaft 14 can be a selected multiple of seventy two from $(1\times72)=72$ through $(35\times72)=2520$.

Referring now to FIGS. 5 through 9, it can be seen that there is a particular manner in which the program holes 34 must be patterned on the A program discs. It has already been mentioned that the holes within a particular program A-1 through A-35 must fall within a circular band of the program disc. The bands are arranged in concentric circles, as can readily be seen from FIGS. 5 through 9. Within the bands, positioning of the holes is equally important. To provide a uniform distance between pulses, the holes should be spaced evenly. However, for reasons that will be apparent when the other programs are discussed, it is important that there be a blank or zero position on each program in the A programs which corresponds to a fixed rotational position of the Alpha shaft 22. Further, no holes on the program should occur within 10° on either side of this zero position.

Accordingly, the holes can be arranged by selecting a certain arcuate section of at least 20° in which no holes shall occur, as shown in FIGS. 5 through 9 and then spacing the holes evenly over the remaining segment of the circle. Alternatively, the holes could be arranged by placing an undrilled hole in the zero position, and then spacing the remaining holes evenly over the circle. In employing this latter method, the arcuate space between holes is determined by adding the undrilled hole to the number of the programs, i.e., the A-24 program band would be divided into 25 equally spaced holes, with the hole at the zero point remaining undrilled. Thus, even in the A-35 program the required 10° is maintained between the zero position and the nearest holes.

Since the Alpha shaft 22 makes seventy-two revolutions per each revolution of Beta shaft 14, for each revolution of reference shaft 14 there will be at least seventy two positions corresponding to the zero position of the Alpha shaft 22.

Referring again to FIG. 1, Beta shaft 14 likewise has mounted upon it program discs $B_1$ through $B_5$ and program disc C. Since the A programs can generate a train of pulses in multiples of seventy-two from 72 (72×1) to 2,520 (72×35) per each revolution of the reference shaft, the purpose of the B program discs and C program disc is to provide the capability of generating an additional 1 to 71 pulses. These pulses will be generated during the periods occupied by the evenly spaced blank positions in the pulse train generated by the A programs, the blank positions being caused by the zero position of the A program. Since there are seventy-two zero positions occurring on each revolution of Beta shaft 14, these additional pulses have the capability of filling from 1 to 71 of these gaps.

In a manner similar to the operation associated with the A programs, there are arranged at the B program discs another thirty-five LED-photocell pairs. The LED's associated with the B programs are designated 48. The photocells associated with the B programs are designate 50. The LED's 48 associated with the program discs $B_1$ through $B_5$ are arranged in five columns of seven, one column corresponding to each of the program discs $B_1$ to $B_5$. The LED's are supported in columns by support members 52.

The photocells 50 are also arranged in five columns of seven, one column corresponding to each of the discs $B_1$ through $B_5$. Photocells 50 are supported in columns by support numbers 54.

Each LED-photocell pair is associated with a specific program which is encoded by holes on one of the concentric bands of the program discs $B_1-B_5$. To select one of the programs B-1 through B-35, one need only selectively energize the LED-photocell pair corresponding to that program.

The program discs $B_1$ through $B_5$ may be viewed in FIGS. 10 through 14. Although seventy-one pulses may be supplied by the remaining programs, discs $B_1$ through $B_5$ only supply thirty-five pulses. The remainder are supplied by disc C. Discs $B_1-B_5$ add missing pulses only to selected odd numbered zero positions. The holes are located in patterns of equally spaced holes approximated to the geometrically closest 10° multiple around a point that corresponds to the center of the zero position of the A programs. Thus, the B-1 program would consist of one hole at the 0 position or 0°, the B-2 program of holes at 0° and 180°, the B-3 program of holes at 0°, 120° and 240°, the B-15 program of 15 holes at 0°, 20° (24° approximated to 20°), 50° (48° approximated to 50°), 70° (72° approximated to 70°), 100°, 120°, etc. The B-1 program thus adds one pulse between rotation of the Alpha shaft, or at the first zero position. The B-2 program adds a pulse between rotations and on the 180° position of the Alpha shaft, or the first and thirty-seventh zero position. B-3 adds pulses at the first, twenty-fifth, and forty-ninth zero positions, etc.

As stated above, there are seventy-two zero positions in each revolution of the Beta shaft 14. Thus, a zero position occurs at every 5° of Beta shaft rotation (360° divided by 72). Also, as stated above, no holes in the A program occurs within less than 10° of a zero position. Thus, by putting the $B_1-B_5$ program holes at the geometrically closest 10° points, pulses can be produced only occur at every second zero position of the "A" programs corresponding to 10°, 20°, 30°, etc. of Beta shaft 14 rotation.

The C program disc has one program, consisting of 36 holes located 10° apart, starting at a 5° point from the zero position of the A programs. Thus, holes occur at 5°, 15°, 25°, etc.; i.e., in those positions left vacant by the B program.

It can now be seen how the $B_1-B_5$ and C program discs cooperate to fill in pulses in the pulse train in the zero positions left by the A programs. If it were desired to add a pulse in each of 55 of the 72 zero positions, one could select the B-19 program and the C program. This would give 19+36=55 pulses.

From the above, it can be seen that there are 2,591 pulses available, 2,520 from the A program, 35 from the B programs, and 36 from the C program. Thus, one can generate pulse trains that selectively contain in increments of 1, from 0 to 2,591 pulses per revolution of Beta shaft 14. For instance, if it were desired to select a pulse train containing 550 pulses per revolution of Beta shaft 14, one would select the A-7 program (7×72=504), with B-10 (10) and C (36).

Note that however few or many pulses are generated per revolution of the Beta shaft, the spacing of the pulses in the pulse train is nearly uniform. This feature is important for smooth operation of the stepping motor and consequently of the feeding apparatus.

Selection of the various programs is accomplished by selecting a particular LED/photocell pair or combination of LED/photocell pairs. While there are a wide variety of switching means which may be employed for making this selection, FIG. 4 shows a currently preferred means. In FIG. 4, there is shown a 5×7 circular contact switch selector set designated generally as 60. A thumbwheel switch selector 62 has seven contacts, corresponding to bus lines 62-1 through 62-7 which correspond to the seven program circles contained on each disc in the A programs. Thumbwheel switch 64 has five contacts connected to the five buses 64-1 through 64-5 corresponding to the five program discs in the A programs. Thus, it can be seen that to select one of the A programs, it is necessary only to go to the one of the thumbwheel selector sets 60 corresponding to the A programs and select on the thumbwheel switches 62 and 64 switch positions corresponding to the disc and column where the program is located. Similar selectors are used with the B programs.

Since the C disc has only one program, and hence, only one LED/photocell pair, all that is necessary is a single on-off switch for the C program.

Thus, the programming for the control unit can be accomplished by the use of 4 thumbwheel switches, corresponding to one set of thumbwheel switches 60 for the A program and an identical set of thumbwheel switches 60 for the B program, and an on-off switch for the C program. By positioning these 5 switches, the operator can selectively generate a series of electrical pulses containing from 0 to 2,591 pulses per revolution of the reference shaft 14. It should be noted that the switches could either energize selected LED's or selectively couple photocell outputs to an output bus.

Instead of a manual thumbwheel selection as described above, the photocell output coupling and/or energizing of LED's could be selected by a suitable memory device, such as perforated tape, magnetic tape and reading device, electronic logic circuits, timers, etc. Such means are well known and are not further described herein.

Referring now to FIG. 3, the output of all of the photocells are connected in parallel to a single output bus 66. Output bus 66 is connected to a pulse amplifier 68, the output of which is in turn connected to pulse conditioner 70. The cumulative effect of pulse amplifier 68 and pulse conditioner 70 is to amplify the pulses to provide sufficient power to a stepping motor 72 and to present the pulse in a wave form that is compatible with the stepping motor 72. Stepping motor 72 can be any motor which is powered by pulsed energy and produces a uniform incremental output per pulse of energy received by it. Such motors are well known to those skilled in the art. The stepping motor for this particular feed apparatus should, in conjunction with a lead screw, advance the carriage 0.001 inches per pulse of received electrical energy.

The present invention may be embodied in other specific forms without departing from the spirit or essential attributes thereof and, accordingly, reference should be made to the appended claims, rather than to the foregoing specification, as indicating the scope of the invention. Particularly, the number of discs, the number of programs on each disc, the spacing of the holes, the number of shafts and the gearing of the shafts are not limited to the specific form shown here. The form shown here represents a preferred form for a specific range of rates of advance and selectable increments.

I claim:
1. An optical encoder comprising:
 (a) program discs mounted on rotating shafts, said discs having holes at predetermined intervals within concentric bands, whereby the number and spacing of the holes within the concentric bands comprises the programs of the disc;
 (b) a first set of said program discs having a reference rotational speed;
 (c) a second set of program discs having a rotational speed equal to a whole number multiple of the rotational speed of the first set of program discs;
 (d) said second set of program discs having a uniform arcuate portion on each concentric band where no holes are located, and the first set of program discs having the holes in each concentric band located approximately at arcuate positions which are whole number multiples of 360° divided by the ratio of the speed of said second set of program discs to the speed of said first set of program discs;
 (e) one or more light sources;
 (f) an array of photocells aligned with the concentric bands of the program discs to receive pulses of light when program holes pass between the light source and a photocell, and produce a pulse of electrical energy when a pulse of light is received;
 (g) means for selectively connecting the electrical outputs of one or more of said photocells to the output of the optical encoder, so that a string of electrical pulses corresponding to the concentric band associated with the connective photocells is put out by the encoder.

2. An optical encoder as in claim 1, wherein the means for selectively connecting the electrical output of one or more of said photocells to the output of the optical encoder is a set of thumbwheel switches.

3. An optical encoder comprising:
 (a) program discs mounted on rotating shafts, said discs having holes at predetermined intervals within concentric bands, whereby the number and spacing of the holes within the concentric bands comprise the programs of the disc;
 (b) a first set of said program discs having a reference rotational speed;
 (c) a second set of program discs having a rotational speed equal to a whole number multiple of the rotational speed of the first set of program discs;
 (d) said second set of program discs having a uniform arcuate portion on each concentric band where no holes are located, and the first set of program discs having the holes in each concentric band located approximately at arcuate positions which are whole number multiples of 360° divided by the ratio of the speed of said second set of program discs to the speed of said first set of program discs;

(e) an array of light sources aligned with the concentric bands of the program discs;

(f) an array of photocells aligned with the concentric bands of the program discs to receive pulses of light when program holes pass between the light source and a corresponding photocell, and produce a pulse of electrical energy when a pulse of light is received;

(g) means for selectively energizing one or more of said light sources, so that a string of electrical pulses corresponding to the concentric bands associated with the energized light sources is put out by the optical encoder.

4. An optical encoder as in claim 3 wherein the means for selectively energizing one or more of said light sources is a set of thumbwheel switches.

5. An optical encoder comprising:

(a) program discs mounted on rotating shafts, said discs having holes at predetermined intervals within concentric bands, whereby the number and spacing of the holes within the concentric bands comprises the programs of the disc;

(b) a first set of said program discs having a reference rotational speed;

(c) a second set of program discs having a rotational speed equal to a whole number multiple of the rotational speed of the first set of program discs;

(d) said second set of program discs having a uniform arcuate portion on each concentric band where no holes are located, and the first set of program discs having the holes in each concentric band located approximately at arcuate positions which are whole number multiples of 360° divided by the ratio of the speed of said second set of program discs to the speed of said first set of program discs;

(e) an array of light sources aligned with the concentric bands of the program discs;

(f) an array of photocells aligned with the concentric bands of the program discs to receive pulses of light when program holes pass between the light source and a corresponding photocell and to produce a pulse of electrical energy when a pulse of light is received;

(g) means for selectively energizing said sources and selectively coupling said photocells to the output of the optical encoder, so that a string of electrical pulses corresponding to the concentric bands associated with the connective photocells and with the energized light sources is put out by the optical encoder.

6. An optical encoder as in claim 5 wherein the means for selectively energizing said light sources and selectively coupling said photocells to the output of the control unit is a set of thumbwheel switches.

7. In an apparatus for feeding a carriage to a machine having a rotating reference shaft, a control unit comprising:

(a) program discs mounted on rotating shafts, said discs having holes at predetermined intervals within concentric bands, whereby the number and spacing of the holes within the concentric bands comprises the programs of the disc;

(b) a first set of said program discs having a reference rotational speed;

(c) a second set of program discs having a rotational speed equal to a whole number multiple of the rotational speed of the first set of program discs;

(d) said second set of program discs having uniform arcuate portion on each concentric band where no holes are located, and the first set of program discs having the holes in each concentric band located approximately at arcuate positions which are whole number multiples of 360° divided by the ratio of the speed of said second set of program discs to the speed of said first set of program discs;

(e) one or more light sources;

(f) an array of photocells aligned with the concentric bands of the program discs to receive pulses of light when program holes pass between the light source and a photocell, and produce a pulse of electrical energy when a pulse of light is received;

(g) means for selectively energizing said light sources and selectively coupling said photo cells to the output of the control unit, so that a string of electrical pulses corresponding to the concentric bands associated with the connective photocells and with the energized light sources is put out by the control unit.

8. A control unit as in claim 7 wherein the means for selectively connecting the electrical output of one or more said photocells to the output of the control unit is a set of thumbwheel switches.

9. In an apparatus for feeding a carriage to a machine having a rotating reference shaft, a control unit comprising:

(a) program discs mounted on rotating shafts, said discs having holes at predetermined intervals within concentric bands, whereby the number and spacing of the holes within the concentric bands comprise the programs of the disc;

(b) a first set of said program discs having a reference rotational speed;

(c) a second set of program discs having a rotational speed equal to a whole number multiple of the rotational speed of the first set of program discs;

(d) said second set of program discs having a uniform arcuate portion on each concentric band where no holes are located, and the first set of program discs having the holes in each concentric band located approximately at arcuate positions which are whole number multiples of 360° divided by the ratio of speed of said second set of program discs to the speed of said first set of program discs;

(e) an array of light sources aligned with the concentric bands of the program discs;

(f) an array of photocells aligned with the concentric bands of the program discs to receive pulses of light when program holes pass between the light source and a corresponding photocell, and produce a pulse of electrical energy when a pulse of light is received;

(g) means for selectively energizing one or more of said light sources, so that a string of electrical pulses corresponding to the concentric bands associated with the energized light sources is put out by the control unit.

10. A control unit as in claim 9 wherein the said means for selectively energizing one or more of said light sources is a set of thumbwheel switches.

11. In an apparatus where feeding a carriage to a machine having a rotating reference shaft, a control unit comprising:
   (a) program discs mounted on rotating shafts, said discs having holes at predetermined intervals within concentric bands, whereby the number and spacing of the holes within the concentric bands comprises the programs of the discs;
   (b) a first set of said program discs having a reference rotational speed;
   (c) a second set of program discs having a rotational speed equal to a whole number multiple of the rotational speed of the first set of program discs;
   (d) said second set of program discs having a uniform arcuate portion on each concentric band where no holes are located, and the first set of program discs having the holes in each concentric band located approximately at arcuate positions which are whole number multiples of 360° divided by the ratio of the speed of said second set of program discs to the speed of said first set of program discs;
   (e) an array of light sources aligned with the concentric bands of the program discs;
   (f) an array of photocells aligned with the concentric bands of the program disc to receive pulses of light when program holes pass between the light source and a corresponding photocell and to produce a pulse of electrical energy when a pulse of light is received;
   (g) means for selectively energizing said light sources and selectively coupling said photocells to the output of the control unit, so that a string of electrical pulses corresponding to the concentric bands associated with the concentric photocells and with the energized light sources is put out by the control unit.

12. A control unit as in claim 11 wherein the means for selectively energizing said light sources and selectively coupling said photocells to the output of the control unit is a set of thumbwheel switches.

13. An apparatus for feeding a carriage to a machine having a rotating reference shaft, comprising:
   (a) a control unit comprising:
      (i) program discs mounted on rotating shafts, said discs having holes at predetermined intervals within concentric bands, whereby the number and spacing of the holes within the concentric bands comprises the programs of the disc;
      (ii) a first set of said program discs having a reference rotational speed;
      (iii) a second set of program discs having a rotational speed equal to a whole number multiple of the rotational speed of the first set of program discs;
      (iv) said second set of program discs uniform arcuate portion on each concentric band where no holes are located, and the first set of program discs having the holes in each concentric band located approximately at arcuate positions which are whole number multiples of 360° divided by the ratio of the speed of said second set of program discs to the speed of said first set of program discs;
      (v) one or more light sources;
      (vi) an array of photocells aligned with the concentric bands of the program discs to receive pulses of light when program holes pass between the light source and a photocell, and produce a pulse of electrical energy when a pulse of light is received;
      (vii) means for selectively energizing said light sources and selectively coupling said photocells to the output of the control unit, so that a string of electrical pulses corresponding to the concentric bands associated with the connective photocells and with the energized light sources is put out by the control unit;
   (b) means responsive to said string of electrical pulses to advance the carriage a uniform distance for each pulse received.

14. An apparatus for feeding a carriage to a machine having a rotating reference, comprising:
   (a) a control unit comprising:
      (i) program discs mounted on rotating shafts, said discs having holes at predetermined intervals within concentric bands, whereby the number and spacing of the holes within the concentric bands comprise the programs of the disc;
      (ii) a first set of said program discs having a reference rotating speed;
      (iii) a second set of program discs having a rotational speed equal to a whole number multiple of the rotational speed of the first set of program discs;
      (iv) said second set of program discs having a uniform arcuate portion on each concentric band where no holes are located, and the first set of program discs having the holes in each concentric band located approximately at arcuate positions which are whole number multiples of 360° divided by the ratio of the speed of said second set of program discs to the speed of said first set of program discs;
      (v) an array of light sources aligned with the concentric bands of the program discs;
      (vi) an array of photocells aligned with the concentric bands of the program discs to receive pulses of light when program holes pass between the light source and a corresponding photocell, and produce a pulse of electrical energy when a pulse of light is received;
      (vii) means for selectively energizing one or more of said light sources, so that a string of electrical pulses corresponding to the concentric bands associated with the energized light sources is put out by the control unit.
   (b) means responsive to said string of electrical pulses to advance the carriage a uniform distance for each pulse received.

15. An apparatus for feeding a carriage to a machine having a rotating reference, comprising:
   (a) control unit comprising:
      (i) program discs mounted on rotating shafts, said discs having holes at predetermined intervals within concentric bands, whereby the number and spacing of the holes within the concentric bands comprises within the concentric bands comprises the programs of the disc;
      (ii) a first set of said program discs having a reference rotational speed;
      (iii) a second set of program discs having a rotational speed equal to a whole number multiple of the rotational speed of the first set of program discs;
      (iv) said second set of program discs having a uniform arcuate portion on each concentric band where no holes are located, and the first set of program discs having the holes in each concentric band located approximately at arcuate positions which are whole number multiples of 360° divided by the ratio of the speed of said second set of program discs to the speed of said first set of program discs;

(v) an array of light sources aligned with the concentric bands of the program discs;

(vi) an array of photocells aligned with the concentric bands of the program discs to receive pulses of light when program holes pass between the light source and a corresponding photocell and to produce a pulse of electrical energy when a pulse of light is received;

(vii) means for selectively energizing said light sources and selectively coupling said photocells to the output of the control unit, so that a string of electrical pulses corresponding to the concentric bands associated with the connective photocells and with the energized light sources is put out by the control unit;

(b) means responsive to said string of electrical pulses to advance the carriage a uniform distance for each pulse received.

16. An apparatus as in any one of claim 13, 14 or 15 wherein the means responsive to the string of electrical pulses to advance the carriage is an electrical stepping motor.

* * * * *